(12) United States Patent
Stevens

(10) Patent No.: US 9,038,189 B1
(45) Date of Patent: May 19, 2015

(54) SYSTEM AND METHOD FOR PROGRAMMING A TRADING SYSTEM

(75) Inventor: Andrew G. Stevens, Palo Alto, CA (US)

(73) Assignee: Rexante, LLC, Palo Alto, CA (US)

( * ) Notice: Subject to any disclaimer, the term of this patent is extended or adjusted under 35 U.S.C. 154(b) by 342 days.

(21) Appl. No.: 13/403,820

(22) Filed: Feb. 23, 2012

Related U.S. Application Data

(60) Provisional application No. 61/446,408, filed on Feb. 24, 2011, provisional application No. 61/446,436, filed on Feb. 24, 2011, provisional application No. 61/502,291, filed on Jun. 28, 2011.

(51) Int. Cl.
*G06F 7/04* (2006.01)
*G06F 21/60* (2013.01)
*G06Q 40/04* (2012.01)
*G06F 21/62* (2013.01)

(52) U.S. Cl.
CPC ............... *G06F 21/60* (2013.01); *G06Q 40/04* (2013.01); *G06F 21/6245* (2013.01)

(58) Field of Classification Search
CPC . H04L 63/0421; H04L 63/1475; G06Q 40/04
USPC .................................. 726/26; 705/35, 36, 37
See application file for complete search history.

(56) References Cited

U.S. PATENT DOCUMENTS

| | | | |
|---|---|---|---|
| 8,510,210 B1* | 8/2013 | Obayashi et al. ................ | 705/37 |
| 2004/0236669 A1* | 11/2004 | Horst et al. ..................... | 705/37 |
| 2007/0198386 A1* | 8/2007 | O'Callahan et al. ........ | 705/36 R |
| 2010/0005032 A1* | 1/2010 | Whaley et al. ............. | 705/36 R |
| 2012/0143742 A1* | 6/2012 | Doherty et al. ................. | 705/37 |
| 2012/0259762 A1* | 10/2012 | Tarighat et al. ................. | 705/37 |

* cited by examiner

*Primary Examiner* — Samson Lemma

(57) ABSTRACT

A trading system includes a server co-located at a financial exchange, a programmable logic device, a logic programmer, a user account that is accessible over a network connection a code storage device that stores code associated with the user account to be programmed into the programmable logic device and a network connection between the programmable logic device and a financial exchange. A method of programming a trading system connected to a financial exchange includes transmitting code to a server, storing code on a server, compiling the code and at least one code library by synthesizing logic elements and mapping logic elements to logic elements in a programmable logic device, and programming a programmable logic device connected to a financial exchange.

24 Claims, 3 Drawing Sheets

SYSTEM AND METHOD FOR PROGRAMMING A TRADING SYSTEM

RELATED APPLICATIONS

This application claims the benefit of U.S. Provisional Application No. 61/446,408 filed 24 Feb. 2011 and entitled "System and Method of Exchange", and this application also claims the benefit of U.S. Provisional Application No. 61/446,436 filed 24 Feb. 2011 and entitled "System and Method for Programming a Trading System," and this application also claims the benefit of U.S. Provisional Application No. 61/502,291 filed 28 Jun. 2011 and entitled "Financial Exchange System."

TECHNICAL FIELD

This invention relates generally to the trading field, and more specifically to a new and useful system and method of programming a trading system in the trading field.

BACKGROUND

Over 70% of the volume on U.S. Stock Exchanges is estimated to be traded using electronic trading systems. Latency on connections between trading computers and exchange computers are currently measured in microseconds, and using the fastest possible computer systems co-located in the exchange data center is a way to reduce latency. Lower latency results in better fills and better positioning in the order book, as well as improved profits from strict arbitrage systems, where the trading system response time in relation to price changes between exchanges is often the difference between making money and losing money.

Thus, there is a need in the trading field to create a new system and method for programming a trading system. This invention provides such a new system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System

A low latency computerized trading system can provide remote access for traders and developers to rapidly deploy and execute trading strategies on an exchange with high performance low latency hardware. A developer of proprietary code libraries may want to distribute code without giving away trade secrets, and without requiring a developer of trading strategies that may utilize the proprietary code libraries to disclose, expose or share their trading secrets, by allowing proprietary code and/or proprietary code libraries to be distributed at compile time. The code libraries can be encrypted on a drive and decoded by a key included with a compiler, or a compiler license, or the code libraries can be located on a remote server and accessible via a login and password or SSH key file included in the compiler. A trading strategy developer may also have trade secrets in their trading strategy code or code libraries of their own which they may not want to share with a hosting service or a commercial developer of code libraries, and they can protect their code and trade secrets by transmitting and storing it in an account on a server, accessible only to their account, and possibly even encrypted to prevent snooping by IT administrators.

Figure 1:
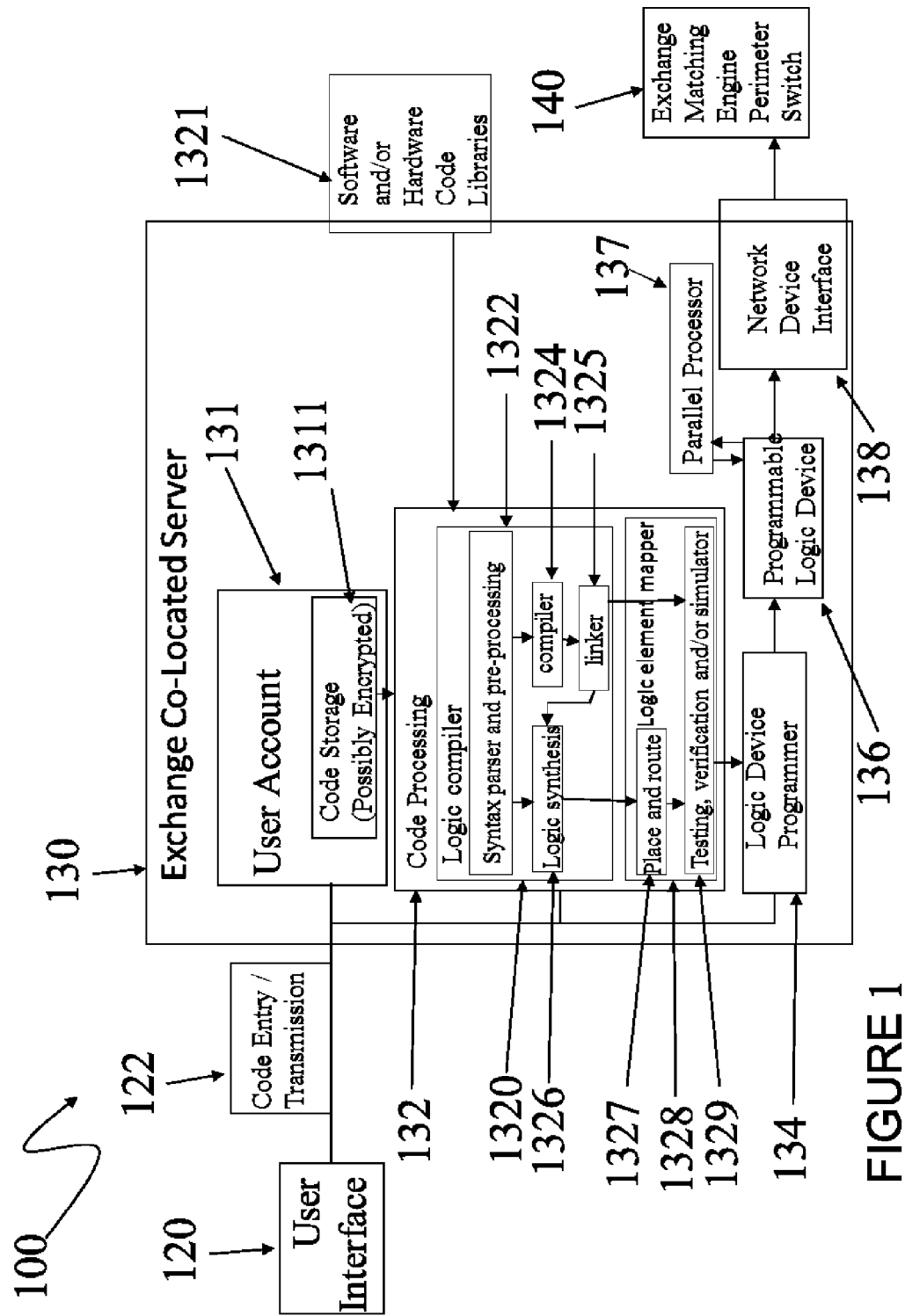
FIG. 1 is a block diagram of an embodiment of the invention.
Figure 2:
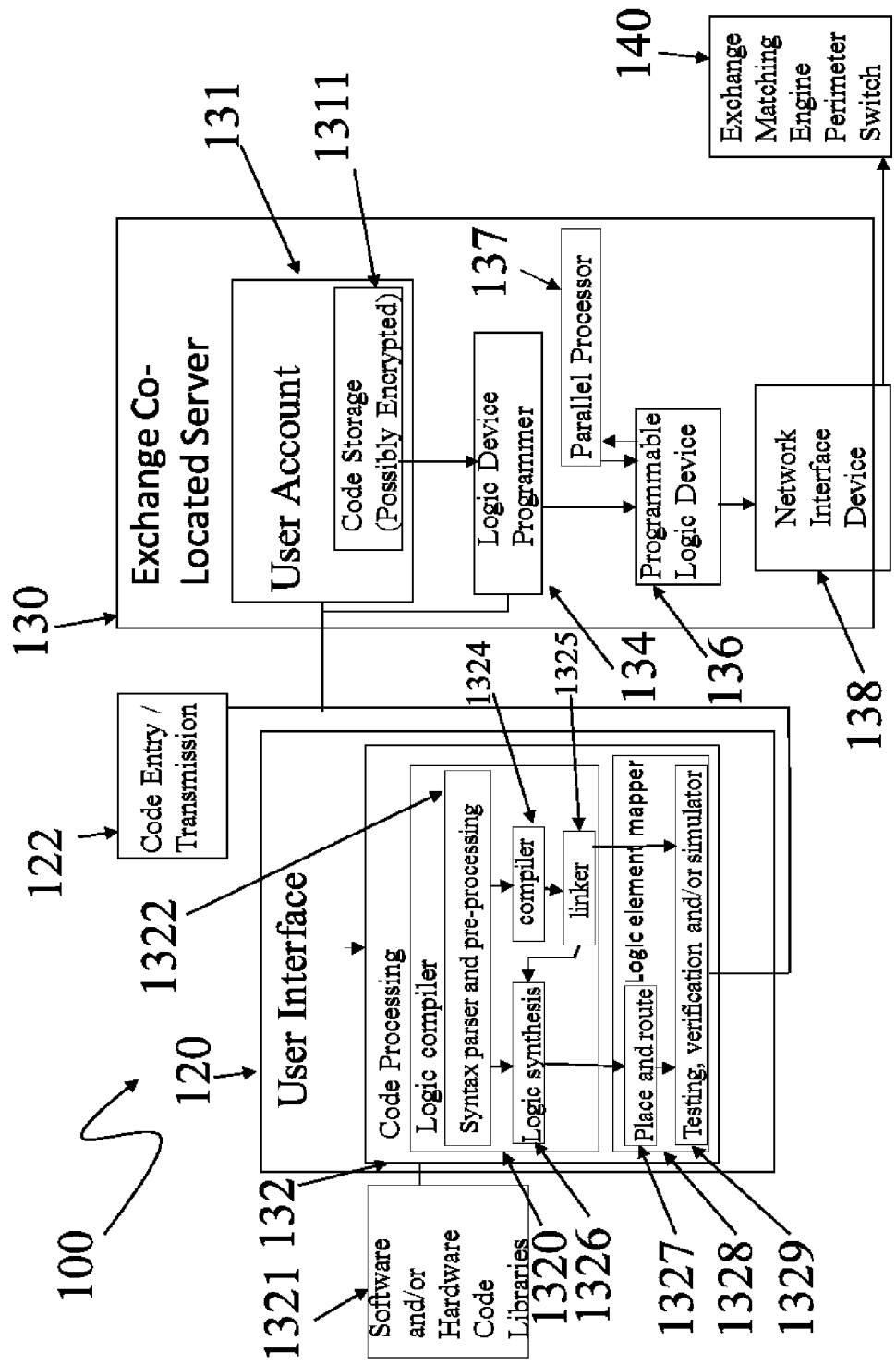
FIG. 2 is a block diagram of an alternative arrangement of the invention.

As shown in FIGS. 1-2, a low latency computerized trading system 100 can include a server 130 which includes a programmable logic device 136 and a connection to the exchange matching engine 140, a user account 131, a user interface 120, a code processor 132, and a logic programmer 134. An optional code storage device 1311 can be used to store user code on the server 130, and an optional parallel processor 137 can be used to offload calculations.

The user interface 120 can be operated directly on a server 130, and/or the user interface 120 can be operated remotely as a software program run on a desktop, laptop, remote web server, cloud computing instance, smart phone, tablet, inside a web browser, on a remote desktop platform, a terminal application with command line shell access, a smart phone application, a web application interface used in a browser, or any other suitable user interface. The user interface 120 can be used to input, edit, download and/or transmit code 122 to a user account 131 on a server 130, and can also be used to set parameters, program a programmable logic device 136, and/or receive and view data, such as code performance data, which can also include trading reports, market data, positions, portfolio information, profit and loss statistics, or any other suitable information.

The server 130 can be a remotely located server, such that a user could login from a remote computer terminal, another server, notebook computer, tablet device, e-reader, web-enabled device, mobile phone, or any other suitable device. A server 130 can be a stand-alone server system, a server instance running on a virtualization platform like Xen or VMWare, or a server 130 can be a cloud computing system, a server instance running on a cloud computing system, such as an instance running on the Amazon EC2 platform, or another cloud computing platform. The server can run an operating system, for example Linux, Unix, Mac OS, Windows, or any other suitable operating system. The server 130 can be accessed over a VPN or virtual private network. The server 130 can include a user account 131, accessible by at least one user or a tier of users in which each tier of users may be assigned various user rights, for example one class of users may edit code 122, and another class of users may only view log files and trading reports, and may be excluded from accessing or editing code 122.

The user account 131 can be located on a server 130 or on a server instance hosted on a cloud computing platform. The user account 131 can be authenticated for a user or a class of users, and may include a VPN authentication, encryption of user stored documents, source code files, databases or other information. The user account 131 can provide access to transmit, enter, store, edit, update, copy, obfuscate and compile code stored on the server, including in-line editing, modification, testing, debugging, profiling, verification, simulation, manual place-and-route and other coding tools. The user account 131 can also be configured to automatically download code or information from a specified location, possibly user editable such as a user operated secure server, or an automatically generated code or data file—for example a basket of orders to execute for a specific time period, each hour, day, week, and so on, or an automatically generated trading system or an automatically generated set of trading system parameters that is optimized over a specific time window (seconds, minutes, hours, days weeks, etc.). The user account 131 can also receive trading reports, such as price information and quotes; trading reports (buy orders, sell orders, filled orders, canceled orders, updated orders, currently active orders, system errors, exchange errors, exchange downtime, option exercise information, etc.) or any other information relevant to the user of the account.

A code storage unit 1311 can be used to store user generated software code and may also be used to store user account information. The code storage unit 1311 can protect the stored code and/or user information by encrypting code, databases or information stored in memory, encrypting code, databases or information on disk, obfuscating code or information, or otherwise protecting code and information from copying by system administrators, other users sharing resources on the same system, same network, same data center, or malicious users, attackers, crackers, hackers, or a thief who steals a physical server. The code storage unit 1311 can be a database, a file path on a hard drive, a location on a file server or regular server, an optical disk, a removable disk, any previously mentioned device connected to a second server, or any other suitable device for storing software code. The code storage unit 1311 can be located on a user device, such as a USB flash drive, a torrent or other peer-to-peer connection over the Internet, or even a user's device (such as a notebook computer or computer terminal) that is used to access the user interface 120 of the system 100. The code storage unit 1311 can be a remote server or a server running on the same computer system, and can be accessed using an SSH key, a username and password. The code storage unit 1311 can alternatively be an encrypted partition or disk drive that can be accessed with a decryption tool.

The user code 122 and/or system libraries 1321, can be combined to create proprietary trading strategies for at least one tradable financial instrument. Software and/or hardware libraries 1321 can be constructed for commonly used and/or optimized system functions (such as an order book, moving average, option pricing), which may be stored as proprietary system libraries or code libraries on the code storage device 1311, or any other storage device, and can also be encrypted or otherwise protected, such that a user may have access to the code libraries, but is unable to copy or reverse engineer the libraries. This may result in the user trusting the server administrator with the user's proprietary code, or it may result in the server administrator trusting the user with the administrator's proprietary code. In one embodiment, the user account 131 on the server 130 can download the system libraries from a central repository before compiling and processing the user code 122. The administrator's proprietary code, which may be used by some or all users via libraries compiled into the software or an Application Programming Interface (API) can include a network layer offloading engine (for example TCP, SoupTCP, UDP, MOLDUDP64, etc.) and physical layer offloading engines, application layer offloading engines such as an exchange protocol offload engine for the Financial Information Exchange (FIX) protocol, FAST (FIX adapted for STreaming) protocol (a compressed format of the FIX protocol), the Nasdaq ITCH/OUCH exchange protocol, or any other suitable exchange protocol offload engine. Additionally, regulatory requirement offload engines can be constructed in hardware to enforce government, exchange, and/or broker-dealer regulations and risk management offloading engines, portfolio management offload engines to monitor margin requirements, position size limitations, account risk levels, or any other suitable regulatory requirements. These calculations can be done in real time before each transaction is placed or after each transaction is filled to ensure compliance with regulatory standards, guidelines or any other suitable constraint. The user can interface with pre-provided software and hardware libraries and documented offload engines for common tasks, such as network offload engines, exchange protocol offload engines, and common task offload engines, such as an order book offload engine, which can process order book update messages (for example, order book levels can be added, deleted, or updated depending on order book messages received from a market data feed, such as updating the quantity at price level 1, adding a new price level 9, etc.). The user code and/or the offload engines can be coded in C and compiled into hardware, or they can be coded natively in a hardware description language like Verilog or VHDL. The user can integrate their proprietary trading strategy with natively coded hardware IP blocks for exchange and network protocol offloading to build a trading system with ultra-low latency which can be on the order of single digit microseconds or hundreds of nanoseconds (e.g. 100-999 nanoseconds).

A programmable logic device 136 can execute be programmed or designed using hardware and/or software to implement a trading system with ultra-low latency. A programmable logic device 136 can interface with a server 130 in many ways; the programmable logic device 136 can be on a PCI-Express card connected to a PCI-Express bus on the server, the programmable logic device 136 can be laid out on the same board or silicon design as a microprocessor or microcontroller on a server, or the programmable logic device 136 can be remotely connected to a server via a USB cable, a network cable, or via another intermediary computer system that functions to receive program code from the server 130 and program the programmable logic device 136. The programmable logic device 136 can be connected to a network interface 138, directly, for example, a physical interface (RJ-45 Ethernet connection, a wireless connection, an IEEE 1394 connection, a fiber optic connection, a CX-4, SFP, SFP+ connection, QSFP interface, a modem, Infiniband, a 1 Gigabit Ethernet, 10 Gigabit Ethernet, 40 Gigabit Ethernet, 100 Gigabit Ethernet connection, or any other suitable physical interface), connected to a programmable logic device 136, where the programmable logic device 136 can contain logic needed to communicate through a network using the physical interface (such as MAC addressing, IP addressing, DHCP configuration, TCP or UDP or other network protocol logic), and/or indirectly; for example, the programmable logic device 136 can be connected to a separate network chipset on the same board, a network offload engine ASIC, a network card over a system bus like PCI-Express, PCI, USB, or other network processing hardware connected to the physical layer of a network. In one embodiment, the Programmable logic device 136 can include an interface to a parallel processor 137.

The parallel processor 137 can be at least one Compute Unified Device Architecture (CUDA) processor or Cell processor or other parallel computing device, where the CUDA processor can be on the same board as the programmable logic device 136, or even integrated into the same semiconductor chip as a programmable logic device 136. A CUDA processor could enable improved performance from calculation offloading in derivative pricing applications which can require many parallel calculations when an underlying asset changes, and in derivative pricing models involving Monte Carlo simulations to numerically solve for derivative prices.

The programmable logic device 136 can also be a combination microprocessor and FPGA device, for example an FPGA device with a custom microprocessor such as a NIOS- II processor constructed from gates inside an Altera or Xilinx or Tabula FPGA, or an Intel Atom E600C series (formerly known as an Intel Stellarton device) which combines an Intel Atom microprocessor integrated with an Altera FPGA on the same silicon chip.

The code processor 132 can process user source code and proprietary and public source code and/or code libraries to make a functional or executable program for the programmable logic device 136. The code processor 132 can include a logic compiler 1320, and a logic element mapper 1328.

The logic compiler 1320 can include a number of elements of a software compiler or a hardware compiler and can output assembly code, machine code, net lists, bit streams, verification files, or any other suitable processed code files. The logic compiler 1320 can include a syntax parser 1322, a compiler 1324, a linker 1325, a logic synthesis tool 1326, and a testing and/or verification and/or simulator tool. The code processor 132 can also include a logic element mapper 1328, which can include a place and route tool 1327, and a testing and/or verification and/or simulator tool 1329.

The logic compiler 1320 can process Hardware Description Languages (HDL) such as Verilog or VHDL (Very High Speed Integrated Circuit (VHSIC) Hardware Description Language) and compile them with a logic synthesis tool 1326 in a logic synthesis process, where the HDL is converted into basic gates and storage elements, or clusters of logic and interconnections between the logic. The logic compiler 1320 can also process higher level languages and synthesize logic directly from the higher level programming language. For example, the compiler 1324 can compile C code into machine code or C code can be compiled directly into a register transfer language (RTL), or a combination of both machine code and RTL. The linker 1325 can link objects generated by a compiler into a single program and submit the compiled and linked program for testing, simulation, verification or execution, where the execution may happen on a processor programmed within the programmable logic device 136, or may be executed directly on a microprocessor, or on a microprocessor programmed into the programmable logic device 136. The logic synthesis tool 1326 can convert either higher level programming languages such as C, or hardware description languages (HDL) code to a logic net list (a list of connected nets which can be viewed as a wiring diagram of logic elements) and associated inputs and outputs on input and output pins. The logic net list, depending on complexity, can be further broken down into a more primitive net list, composed of more basic logic elements—such as ALUTS (Adaptive Lookup Tables) in an FPGA, Logic gates in a programmable logic device, or any other suitable primitive logic element. The logic synthesis tool 1326 can also include logic analysis, pin layout validity checking, elaboration and logic optimizations, for example simplifying logic or adapting logic for better performance or compatibility with a particular programmable logic device (such as a particular brand or model of FPGA). The logic compiler 1320 can connect to a remote server using an SSH key, a username/password, or any other suitable authentication means, and can access code libraries to include in the compilation process. In an alternative variation, the logic compiler 1320 can include a decryption tool or decryption key that can be used to access encrypted code libraries or an encrypted code storage device 1311, such that a program compilation can include the decrypted code libraries.

The logic element mapper 1328 can include a place and route tool 1327 that can process a net list of synthesized logic produced by a logic compiler 1320. A net list of synthesized logic can be processed by partitioning off blocks of interconnected logic to approximate logic gate layouts and pin outs (and pin out validity checking—making sure that the pin out is even possible) before doing a more finely detailed (and possibly iterative) mapping or assigning of the synthesized logic blocks to specific logic blocks and electronic components and circuits inside a programmable logic device 136 such as an FPGA. The place and route tool 1327 can use timing and power information for each element in the programmable logic device 136 to evaluate and optimize a routing or placement under area, power and/or timing constraints, and possibly process through one or more iterations to improve timing constraints, power constraints, or other performance constraints. The place and route tool 1327 can output an encoded bit stream to program a programmable logic device 136, formatted for a particular proprietary format for a specific brand and/or model of programmable logic device 136, such as an Altera, Xilinx or Tabula FPGA. The place and route tool 1327 can be extended to further transform a net list of synthesized logic into an integrated circuit layout, for example an ASIC, or alternatively an Altera Hard Copy ASIC device, or any suitable integrated circuit design.

The code processor 132 can include a testing, verification, and/or simulation tool 1329, which can test and simulate the logic before it is programmed to the programmable logic device 136, and verify the programmable logic device 136 after the programmable logic device 136 has been programmed. The testing, verification, and/or simulation tool 1329 can initialize values in the programmable logic device 136, for example setting historical market data, key chart points, parameters, and so on. Simulation can include simulating exchange data or other real-time data and making sure the output of the programmable logic device is correct. Random test vectors can also be generated to improve the ability of the testing and verification system to generate unexpected conditions and potentially discover bugs, errors and unexpected behavior. Verification can include making sure that each element programmed into the programmable logic device 136 is functioning as it should (e.g. as it was simulated), and verify that there are no defects (for example, a timing delay) in the programmable logic device 136 as programmed that could impair or alter the output of the programmable logic device 136. The testing, verification and/or simulation tool 1329 can also include an interface for Tool Command Language (TCL) scripts and/or another suitable scripting language and/or an automated testing framework or harness.

Simulating risk management in automated trading systems with direct market access may be required by government regulatory bodies in the U.S. and abroad, in particular in response to the events of May 6, 2010, a day which has been nicknamed "The Flash Crash." The testing, verification, and/or simulation tool 1329 can also include risk management tools to monitor system responses to simulated or actual market data conditions. For example, if a large move in a particular traded asset was in play, a position size limit would be enforced based upon the account size and the market data. As an additional example, testing "what if" scenario effects on margins before a trade is placed to make sure a particular executed trade is going to be within regulations and risk controls for both a brokerage customer, the broker-dealer, and/or the exchange.

The logic programmer 134 can program at least one programmable logic device 136. The logic programmer 134 can program or configure the programmable logic device 136 with a net list format or a net list in a binary bit stream format (a series of on or off bits corresponding to switches in an FPGA device). The logic programmer 134 can be a software program or a hardware device, processing configuration files and code and programming a programmable logic device over a hardware connection. If more than one programmable logic device 136 is used in the system, the logic programmer 134 can select which programmable logic device 136 to program, and may also enable or disable the programmable logic devices, for example if multiple programmable logic devices are connected to one logic programmer 134, the logic programmer 134 can select at least one programmable logic device 136 to program. The logic programmer 134 can be controlled by the user account 131, or the logic programmer 134 can be automatically executed for all user accounts at the same time, programming one or all logic devices 136 simultaneously, for example at a specific time interval or time of day, e.g. before the market opens.

The exchange can be a stock exchange, a commodity exchange, a futures exchange, and options exchange, a financial derivatives exchange, a weather exchange, a carbon emissions exchange, a financial instrument exchange or any other suitable exchange.

2. Method

The ability to submit code over a network to a co-located trading system is quite valuable in terms of reducing hardware costs, and man-hours for IT development, maintenance and administration. Additionally, allowing trading system developers the ability to write strategies that interface with proprietary software code libraries and/or hardware IP block code libraries adapted for financial exchanges without giving a developer full access to the source code protects the proprietary code libraries. The proprietary code libraries can be stored separately on an encrypted partition, a separate server or other storage device and only accessed when needed by the compiler program, and remaining otherwise inaccessible to protect trade secrets and intellectual property.

Figure 3:
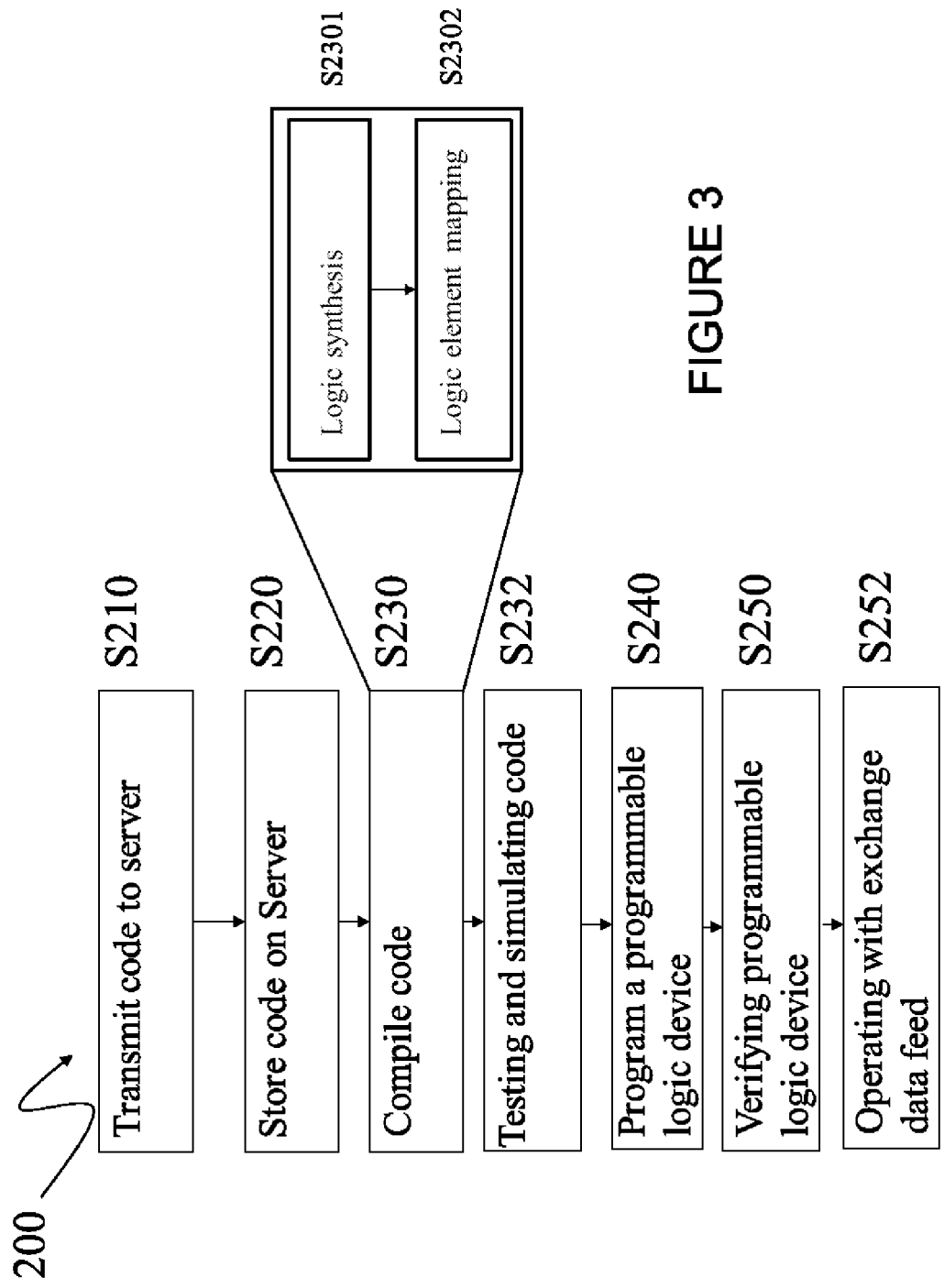
FIG. 3 is a flowchart of the method of the invention.

As shown in FIG. 3, a method 200 of programming a low latency computerized trading system can provide remote access for traders and developers to rapidly deploy and execute trading strategies on an exchange with high performance low latency hardware. The method 200 can include transmitting code to a server S210, storing code on a server S220, compiling the code S230, testing and simulating code S232, programming a programmable logic device S240, verifying the programmable logic device S250, testing with an exchange data feed S252.

Step S210, which recites transmitting code to a server, can include capturing input from a user interface. The transmission of code from a user interface can be from a software program run on a desktop, laptop, remote web server, cloud computing instance, smart phone, tablet, inside a web browser, on a remote desktop platform, a smart phone application, a web application interface used in a browser, or any other suitable user interface. The transmission can include code or other input, edits, downloads to a user account on a server. The code transmission can also include setting parameters or variables for a pre-written program. The actual transmission can include a file transfer of code from a user computer or another site. The file transfer can be performed over FTP, SecureFTP, SCP, bit torrent, web form upload, file copying from another account on the same local disk, local server, local data center, or any other suitable technique of transferring files. The code may be transmitted over a VPN or secure HTTP connection or any other suitable secure or unsecured connection method. The code can be fully uncompiled source code, partially compiled source code, uncompiled source code and compiled libraries, fully compiled source code (i.e. machine code), or any combination thereof. The code can be Verilog, VHDL, Register Transfer Language (RTL), TCL, C, Assembly, or any other suitable programming language. The user code can be interfaced with a standard exchange-facing interface, which may be pre-compiled, or interface with code transmitted to the server.

Step S220, which recites storing code on a server, functions to preserve the code syntax until the code can be compiled and/or executed directly (in the case of an interpreted language or scripted language). The code can be stored in chip cache memory, system memory, flash memory, on a hard disk of a server, on a flash drive, on an optical disk, in a database or database server, or any other suitable storage medium. The stored code can be encrypted in memory, encrypted on disk, obfuscated, or otherwise protected from copying by system administrators, other users on the same machine, same network, same data center, or malicious users, attackers, hackers, or a thief who steals a physical server. The stored code can be linked to a user account, and can be accessed by a user, author, owner, or administrator through a user interface, allowing the viewing, editing, commenting, maintaining, deleting of the code. The code can be accessed through a web portal, a secure shell program (SSH), remote desktop software, or any other suitable remote access functionality.

Step S230, which recites compiling code, functions to process user source code and proprietary and public source code and/or code libraries to make a functional or executable program or configuration for a programmable logic device. Step S230 can also be performed on a computer or other device connected to the server over a network. Step S230 can include a logic processing sub-step 2301, which can include compiling Hardware Description Languages (HDL) such as Verilog or VHDL (Very High Speed Integrated Circuit (VHSIC) Hardware Description Language) and compiling them with a logic synthesis tool in a logic synthesis process, where the HDL is converted into basic gates and storage elements, or clusters of logic and interconnections between the logic and can include outputting a logic net list (a list of connected nets which can be viewed as a wiring diagram of logic elements), bit streams, assembly code, machine code, verification files, or any other suitable processed code files. The logic net list, depending on complexity, can be further broken down into a more primitive net list, composed of more basic logic elements—such as ALUTS (Adaptive Lookup Tables) in an FPGA, Logic gates in a programmable logic device, or any other suitable primitive logic element. Step S230 can also include logic analysis, pin layout validity checking, elaboration and logic optimizations, for example simplifying logic or adapting logic for better performance or compatibility with a particular programmable logic device (such as a particular brand or model of FPGA).

Step S230 can also include syntax checking, parsing, compiling, linking, analysis, elaboration, initialization, and testing and/or verification and/or simulation. Compiling can include compiling C code into machine code or compiling C code directly into a register transfer language (RTL), or a combination of both machine code and RTL. The step can include linking to link objects generated by a compiler into a single program and submit the compiled and linked program for testing, simulation, verification or execution, where the execution may happen on a processor programmed within a programmable logic device, or the program may be executed directly on a microprocessor. The logic synthesis sub-step 2301 can also include logic optimizations, for example simplifying logic, improving timing, shortening signal paths, or adapting logic for better performance or compatibility with a particular programmable logic device (such as a particular brand or model of FPGA).

Step S230 can also include a logic element mapping sub-step 2302, which can include can mapping or assigning the synthesized logic blocks to specific logic blocks and electronic components and circuits inside a programmable logic device, such as an FPGA, and can also include placing and routing. The logic element mapping sub-step 2302 can also include processing a net list by partitioning off blocks of interconnected logic to approximate logic gate layouts and pin outs (and pin out validity checking—making sure that the pin out is even possible) before doing a more finely detailed (and possibly iterative) mapping or assigning of the synthesized logic blocks to specific logic blocks and electronic components and circuits inside a programmable logic device, such as an FPGA. Additionally, the logic element mapping sub-step 2302 can use timing and power information for each element in a programmable logic device to evaluate and optimize a routing or placement under area, power and/or timing constraints. The logic element mapping sub-step 2302 can output a net list of connections to configure a programmable logic device, which may be encoded as a bit stream formatted for a particular proprietary format for a specific brand and/or model of programmable logic device, such as an Altera, Xilinx or Tabula FPGA. The placing and routing step can be extended to further transform a net list into an integrated circuit layout, for example an ASIC, or alternatively an Altera Hard Copy ASIC device, or any suitable integrated circuit design.

Step S232, which recites testing and simulating code, can include testing and simulating the logic and/or code before and/or after it is programmed to a programmable logic device. Simulation can include simulating exchange data or other real-time data and making sure the output of the programmable logic device is correct. The testing and/or simulation step can also include an interface for Tool Command Language (TCL) scripts and/or another suitable scripting language and/or an automated testing framework or harness.

Step S240, which recites programming a programmable logic device, functions to program the logic gates of a field programmable gate array or other programmable logic device with trading strategy logic and network and exchange protocol interfaces. The programmable logic device can be connected to an exchange via a network connection, which can be a 10 Gig Ethernet Connection, a 40 Gig Ethernet connection, a 100 Gig Ethernet connection, or any other suitable network connection. The programmable logic device can be an FPGA, CPLD, PLC, PIC, Flash memory connected to a microprocessor, flash memory embedded in a microprocessor, or any other suitable programmable logic device. The actual programming of the device can be performed with software or hardware tools, and may use a binary bit stream file and/or net list or any other suitable configuration file for programming a programmable logic device.

Step S250, which recites verifying the programmable logic device, functions to verify that the programmable logic device programmed in Step S240 has been verified—where verification can include making sure that each logic element in the programmable logic device is functioning as it should (e.g. as it was simulated), and verify that there are no defects in the programmable logic device as programmed that could impair or alter the output of the programmable logic device. If errors are found in the verification (such as a timing error), then either or both of the net list for the programmable logic and the physical programmable logic device must be checked for defects.

Step S252, which recites operating with an exchange data feed can operate and test the programmed and verified programmable logic device with real exchange data and test the actual trading logic developed using real-live data, historical data, simulated data, or random data. Exchanges such as the CME have a test feed that can be harnessed to test systems in real-time and accurately simulate real exchange conditions.

Simulating risk management in automated trading systems with direct market access may be required by government regulatory bodies in the U.S. and abroad, in particular in response to the events of May 6, 2010, a day which has been nicknamed "The Flash Crash." Steps S232, S250, and S252 can also include risk management tools to monitor test and verify system responses to simulated or actual market data conditions. For example, if a large move in a particular traded asset was in play, a position size limit would be enforced based upon the account size and the market data. As an additional example, testing "what if" scenario effects on margins and position sizes against size limits and capital available before a trade is placed to make sure a particular executed trade is going to be within regulations and risk controls for proprietary trading groups, brokerage customers, the broker-dealers, and/or the exchanges.

Step S252 may also include testing the trading algorithm for position sizes against parameters of a user's account, for example, the amount of cash in a user's account would instill a limit on the maximum position size and price change in a futures contract, and would limit the number of futures contracts a user could trade. The testing program could verify the position size (for risk management purposes) for each new program, ensuring that each new trading strategy or change in strategy is not going to be trading with a larger position size than the account is capable of and potentially causing losses for the user, their broker, sponsor, or clearing house, and introducing additional volatility for the exchange and additional risk for the individual parties. This "clear-to-trade" testing functionality could also be included in the programmable logic code if the parameters are relatively well known beforehand, or the parameters could be a dynamic variable set in the registers of a programmable logic device during each time window (for example each hour, day, week, month, etc.) or whenever an exchange alters margin requirements, account minimums, position size limits or any other factor that would affect a trading entity's regulatory risk requirements.

As a person skilled in the art will recognize from the previous detailed description and from the figures and claims, modifications and changes can be made to the preferred embodiments of the invention without departing from the scope of this invention defined in the following claims.

I claim:

1. A system, comprising:
a server, wherein the server comprises a microprocessor, and wherein the server is co-located at a financial exchange;
a programmable logic device;
a logic programmer to program the programmable logic device;
a first user account on the server, wherein the first user account is accessible over a first network connection to the server;
a first code storage device, wherein the code storage device stores code to be programmed into the programmable logic device with the logic programmer, wherein the code comprises synthesized logic, and wherein the code implements a computer program for a trading strategy, and wherein the critical path for the execution of the computer program for the trading strategy is contained within the programmable logic device, and wherein the programmable logic device exhibits a lower execution time for the computer program for a trading strategy to generate a response to an event than the execution time for the same computer program for a trading strategy executed with a general purpose microprocessor, and wherein the event response execution time for the computer program for a trading strategy is between 100 and 999 nanoseconds, and wherein the code is associated with the first user account; and a second network connection, connecting the programmable logic device to a financial exchange.

2. The system of claim 1, further comprising a code processor, wherein the code processor comprises:

a logic compiler; and a logic element mapper.

3. The system of claim 2, wherein the code processor is located on the server.

4. The system of claim 2, wherein the code processor is on a computer system connected to the server over the first network connection.

5. The system of claim 4, wherein the code storage device stores completely compiled code.

6. The system of claim 3, wherein the code storage device stores uncompiled code.

7. The system of claim 6, further comprising at least one code library, wherein the code processor can access the code library at compile time.

8. The system of claim 7, further comprising a second code storage device, wherein the second code storage device stores at least one code library.

9. The system of claim 8, wherein the second code storage device is an encrypted storage device in the server.

10. The system of claim 8, wherein the second code storage device is a remote network server, wherein the remote network server is accessible over the first network connection to the server co-located at the exchange.

11. The system of claim 7, wherein the code library includes an order book offload engine.

12. The system of claim 2, wherein the logic compiler includes a C compiler.

13. The system of claim 2, wherein the logic compiler includes one selected from the group consisting of: VHDL compiler and Verilog compiler.

14. The system of claim 1, further comprising a second user account associated with the first user account, wherein the second user account can access code performance data and wherein the code performance data includes one selected from the group consisting of: profit and loss report, position report, portfolio report.

15. The system of claim 7, wherein the code library includes a network protocol offload engine.

16. The system of claim 7, wherein the code library includes an exchange protocol offload engine, and wherein the exchange protocol is the FAST protocol.

17. The system of claim 1, wherein the programmable logic device comprises a microprocessor and an FPGA.

18. The system of claim 17, wherein the microprocessor is integrated with the FPGA on the same silicon chip.

19. The system of claim 18, wherein the server runs on the microprocessor of the programmable logic device, and wherein the server runs an operating system.

20. The system of claim 1, wherein the programmable logic device further comprises a PCI-Express interface, and wherein the server further comprises a PCI-Express bus, and wherein the PCI-Express interface is connected to the PCI-Express bus on the server, and wherein the programmable logic device is adapted to interface with the server through the PCE-Express interface.

21. The system of claim 1, wherein the programmable logic device further comprises a network interface, and wherein the server further comprises a network interface, and wherein the network interface of the programmable logic device is connected to the network interface on the server.

22. The system of claim 1, further comprising a second user account, and wherein the programmable logic further comprises a user account limitation filter, and wherein the second user account is adapted to control the user account limitation filter.

23. The system of claim 22, wherein the user account limitation filter is adapted to perform one selected from the group consisting of: filter a risk control value below a threshold and filter a risk control value above a threshold.

24. The system of claim 23, wherein the risk control value is one selected from the group consisting of: position size limit, margin requirement, account risk level, account cash balance.

* * * * *